(12) United States Patent
Jahankhani

(10) Patent No.: US 8,185,818 B2
(45) Date of Patent: May 22, 2012

(54) MIXED TECHNIQUES FOR HTML CROSSTAB RENDERING

(75) Inventor: Saeed Jahankhani, West Vancouver (CA)

(73) Assignee: Business Objects S.A., Levallois-Perret (FR)

( * ) Notice: Subject to any disclaimer, the term of this patent is extended or adjusted under 35 U.S.C. 154(b) by 722 days.

(21) Appl. No.: 12/334,600

(22) Filed: Dec. 15, 2008

(65) Prior Publication Data

US 2010/0153682 A1 Jun. 17, 2010

(51) Int. Cl.
*G06F 17/00* (2006.01)
(52) U.S. Cl. .......................................... 715/227
(58) Field of Classification Search .................. 715/243, 715/227
See application file for complete search history.

(56) References Cited

U.S. PATENT DOCUMENTS

| | | | |
|---|---|---|---|
| 2006/0004718 A1* | 1/2006 | McCully et al. | 707/3 |
| 2007/0299821 A1* | 12/2007 | McCully et al. | 707/3 |
| 2008/0198156 A1* | 8/2008 | Jou et al. | 345/418 |
| 2009/0282385 A1* | 11/2009 | Boland et al. | 717/106 |

OTHER PUBLICATIONS

Heffelfinger, Jasperreports for Java Developers, Packt Publishing, Birmingham, AL, 2006, p. 149-151; p. 200-211; p. 229-231.*
Fitzgerald et al., Special Edition Using Crystal Reports 10, Que Publishing, 2004, p. 456-457; p. 491-492.*

* cited by examiner

*Primary Examiner* — Laurie Ries
*Assistant Examiner* — Frank D Mills

(57) ABSTRACT

What is described is a method and system for rendering HTML tables and crosstabs when insufficient data is available about the structure of the tables and data elements are positioned relative to the top-left corner of the table and not their first container, which is table data (TD).

9 Claims, 7 Drawing Sheets

| A | B |
|---|---|
| C | D |

Figure 8

MIXED TECHNIQUES FOR HTML CROSSTAB RENDERING

FIELD OF THE INVENTION

The present invention relates to data processing. More precisely, this invention relates to data processing in connection to rendering HTML tables and crosstabs.

BACKGROUND OF THE INVENTION

World Wide Web Consortium (W3C) defines two techniques to set an element position in HTML tables: position and floats. For the position based technique, there are four possible ways to calculate the position of an element in HTML document: static, relative, absolute, and fixed. An element with static position always has the position the normal flow of the page gives it. A static element ignores any top, bottom, left or right declarations. An element with relative position moves an element relative to its normal position, which the page assigns to it. For example "left 20" adds 20 pixels to the LEFT position of the element. An element with absolute position is positioned at the specified coordinates relative to its containing block. The element's position is specified with the "left", "top", "right", and "bottom" properties. An element with fixed position is positioned at the specified coordinates relative to the browser window. The position of the element is specified with the "left", "top", "right", and "bottom" properties. The element remains at that position regardless of scrolling.

A crosstab (abbreviation of cross-tabulation) is a visualization of data that displays the joint distribution of two or more variables simultaneously. Crosstabs are layouts of data in rows, columns, and pages. A dimension is a structure that categorizes data. In analytic workspace, a dimension is a container for a list of values. In a crosstab, dimension members are listed across the first row and down the first column; the data for measures appears in the cells that form the body of the crosstab. A crosstab can be used to display summary information and show how data varies across dimensions, such as sales by region by month. Each cell shows the value associated with the specific combination of row and column headings. Crosstabs are usually presented in a matrix format; hence, a crosstab is sometimes called a matrix.

All four possible ways (values) to calculate the position of an element according to the position based technique described above, when used alone, are insufficient for rendering HTML tables and crosstabs, when crosstab data elements are positioned relative to the top-left corner of the table and not their first container, which is table data (TD). Fixed value positions all data with respect to a browser window and, if there are other tables and elements in the page with fixed property, the data and the other tables and elements overlay each other. Static value positioning does not allow offset values to be applied to data and cannot position data. Relative value positions data with respect to its original position and not top-left corner of the table. Absolute value positions data with its first container/parent, which is table data (TD) and not top-left corner of the table.

SUMMARY OF THE INVENTION

A computerized method and a system are described for rendering HTML tables and crosstabs where all data coordinates are specific to the top-left corner of the table/crosstab. In one embodiment of the invention, the method includes changing the position value of each table data to absolute and setting the top-left offset of each table data to 0 pixel, 0 pixel. Thus, all cells appear on top of each other and the top left corner of each table data appear on top of a table's top left corner. The method also includes changing the position value of data elements to absolute; and setting the top-left property of the data elements.

In one embodiment of the invention, the system includes a viewer control to receive request from browser for viewing and a "reportsource" to provide Encapsulated Page Format byte stream to the viewer control. The system also includes a page object model to convert the Encapsulated Page Format byte stream to object model and a report renderer to convert the object model to HTML, wherein converting tables and crosstabs is performed by changing the position value of each table data to absolute; setting the top-left offset of each table data to 0 pixel, 0 pixel; changing the position value of data elements to absolute; and setting the top-left property of the data elements.

BRIEF DESCRIPTION OF THE DRAWINGS

FIG. 7 is an exemplary illustration of the situation, where the border properties of a table are removed.

FIG. 8 is an exemplary illustration of the situation, where table border is added as table elements' border on top of the table data.

DETAILED DESCRIPTION

What is described is a method and system for rendering HTML tables and crosstabs when insufficient data is available about the structure of the tables and data elements are positioned relative to the top-left corner of the table and not their first container, which is table data (TD).

Figure 1A:
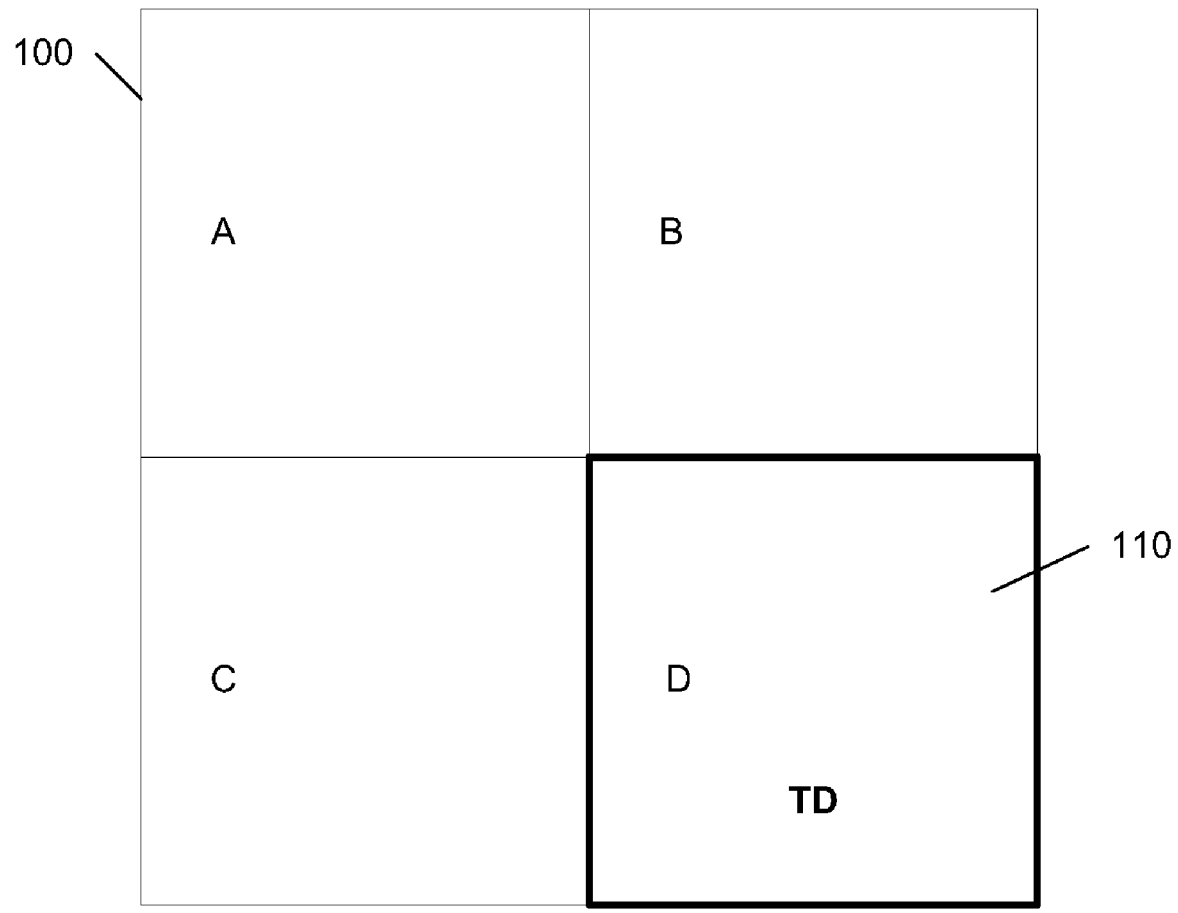
FIG. 1a is an exemplary illustration of a structure of an HTML table.
Figure 1B:
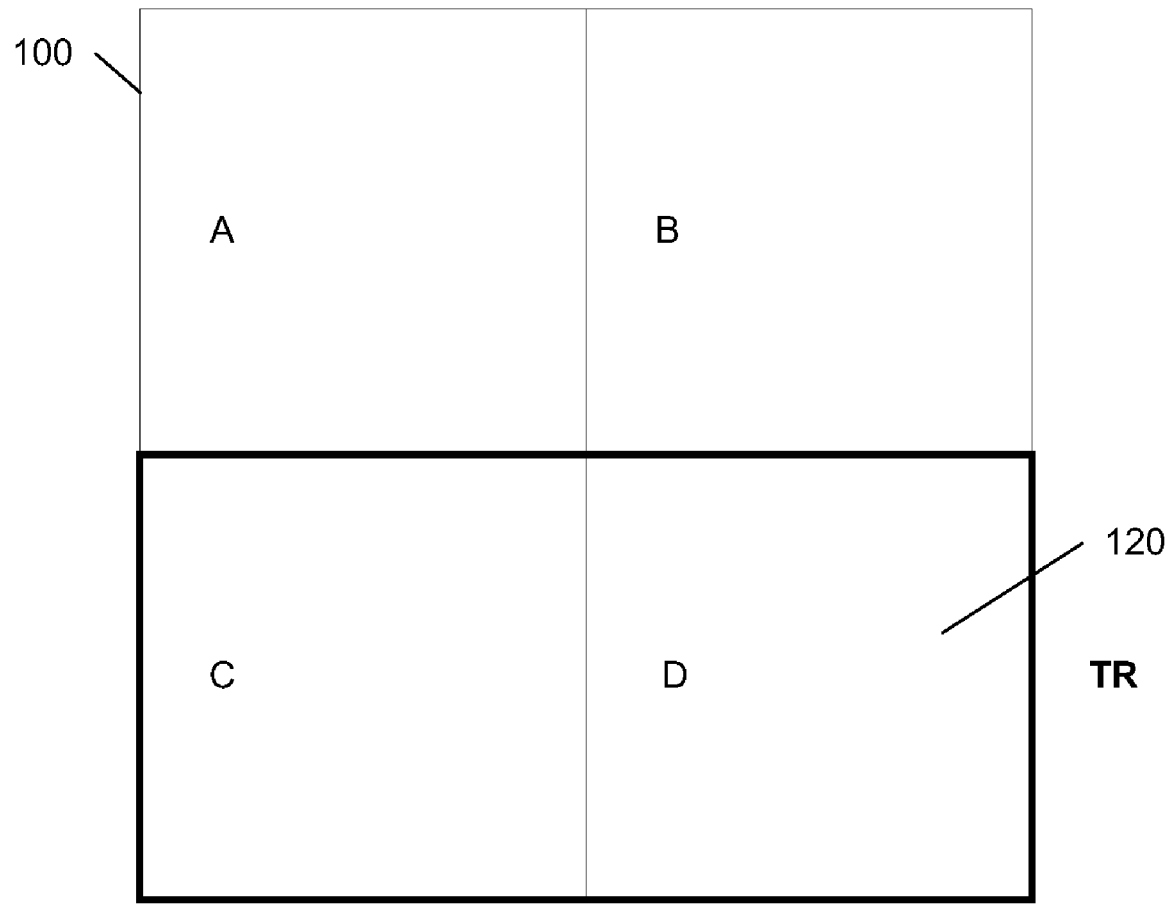
FIG. 1b is an exemplary illustration of a structure of an HTML table.

FIGS. 1a and 1b represent an exemplary illustration of a structure of an HTML table 100. Table 100 includes rows and cells. In HTML, a row is tagged "TR" and a cell is tagged "TD". An example of a cell is the highlighted D cell 110 in FIG. 1a. TD stands for Table Data and TD is a container of data elements. TD is a cell in the table 100. In FIG. 1b, a row TR 120 is shown. TR stands for Table Row and is a container for a list of TDs that span only one row. Following the same logic a table is a container for TRs. The term parent container is a block, containing peer items. Peer items are, for example, several TDs for a row or several rows for a table. A parent container can be, for example, a list of TDs, which is actually a row, or a table.

Figure 2:
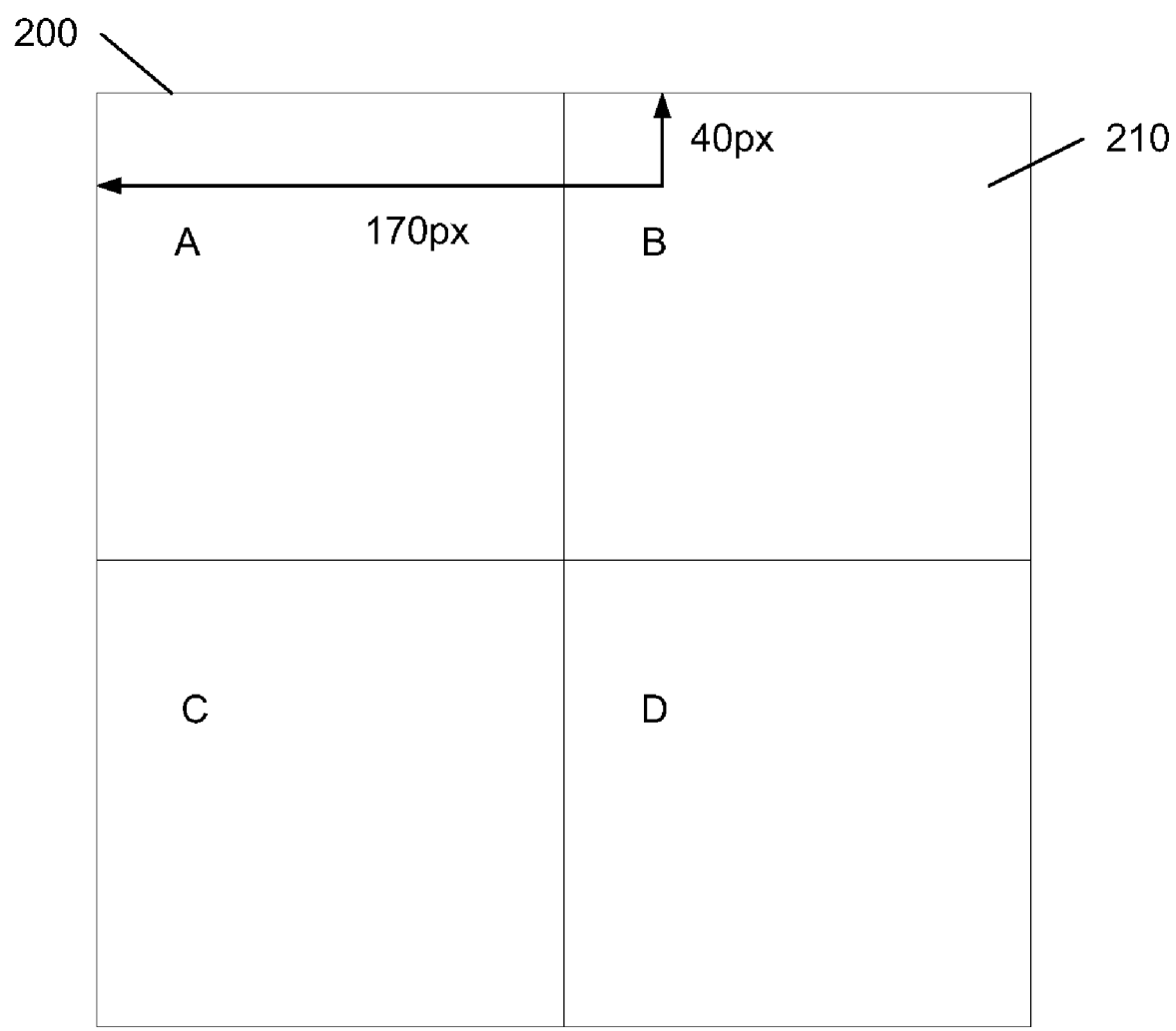
FIG. 2 is an exemplary illustration of a table where all its elements are positioned in relation to the top-left corner of the table.

FIG. 2 is an exemplary illustration of a table 200 where all its elements are positioned in relation to the top-left corner of the table 200. Table 200 includes four data cells. All cells contain column and row number data and the content and each cell contains its offset with respect to top left corner of the table 200. For example, cell B 210 contains its row and column number (for example, 1, 2) and cell B 210 contains its offset with respect to the table 200 (for example, 170, 40). Because of the deficiency in HTML for positioning of elements when the only data for element's position is with respect to the top-left corner of the table 200, some kind of technique should be used that should enable such kind of positioning.

Figure 3:
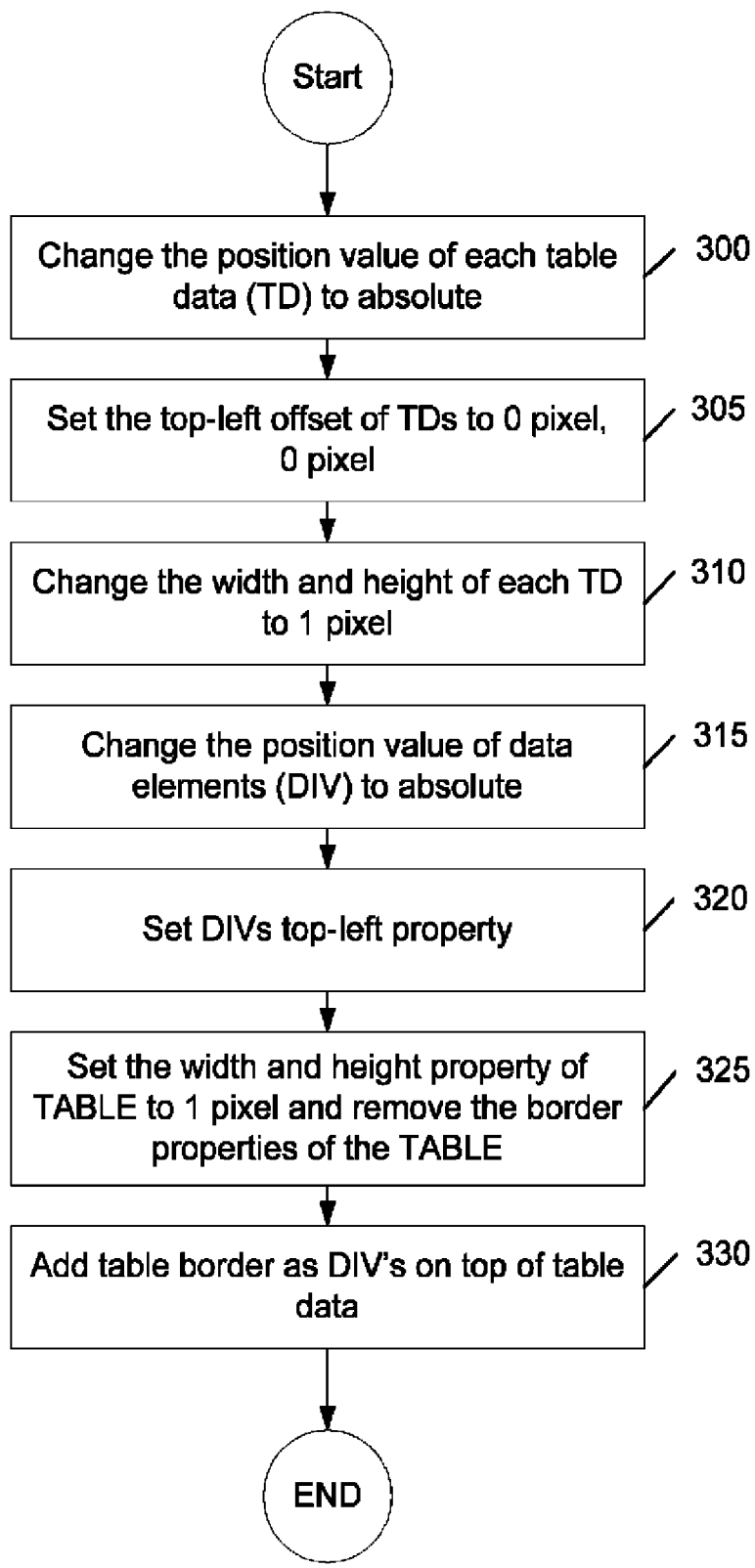
FIG. 3 is a flow diagram of an embodiment of a method for rendering HTML tables and crosstabs, when all data coordinates are specific to the top-left corner of a table or a crosstab.
Figure 5:
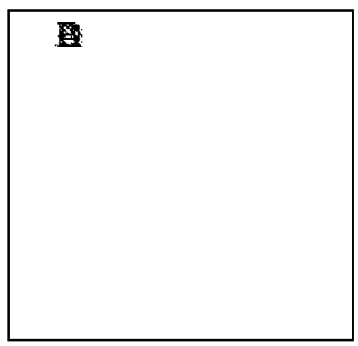
FIG. 5 is an exemplary illustration of the situation, where all cells of a table overlap each other and the top-left corner of each table data appears on top of table's top-left corner.

FIG. 3 is a flow diagram of an embodiment for rendering HTML tables and crosstabs where all data coordinates are specific to the top-left corner of a table or a crosstab. In the description, the terms table and crosstab should be considered replaceable. At block 300, the position value of each table data (TD) is changed to absolute. Thus, the position of each TD is positioned at the specified coordinates relative to its containing block, which is the table. At block 305, the top-left offset of TDs is set to a vertical offset of 0 pixels and a horizontal offset of 0 pixels. Those skilled in the relevant art will recognize left-handed coordinate systems as a convention, while a right-handed coordinate systems may also be used. A tuple can express offsets in various forms including: 0 px, 0 px; (0 px, 0 px); 0 pixel, 0 pixel; and the like. A pixel (px) is an abbreviation of Picture Element and is the information stored for a single grid point in the image. The 0 pixel, 0 pixel setting indicates the top-left position of the grid. The complete image is a rectangular array of pixels. After setting all the cells in the table to 0 pixel, 0 pixel, all cells appear on top of each other and TD's top left corner appear on top of table's top left corner. This is illustrated in FIG. 5. This is the first part of the method, being embodiment of the invention. By placing all the cells on top of each other at the top-left corner, the data elements are prepared to be positioned according to the available data, which orientation is in relation to the top-left corner of the table.

Figure 6:
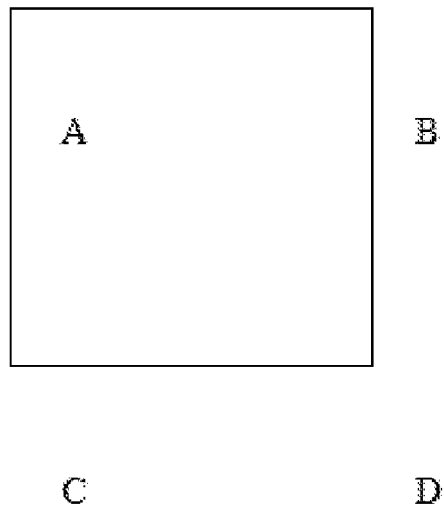
FIG. 6 is an exemplary illustration of the situation, where the position value of all data elements of a table is changed to absolute and the top-left property of the data elements is set.

Referring again to FIG. 3, at block 310, the width and height of each TD is set to 1 pixel, thus making the table elements non-selectable. The position and dimension of data elements placed in each TD remains unaffected. Normally, the table elements are selectable, by dragging over them a mouse or another pointing device. Changing the size of each TD to (1 pixel, 1 pixel) ensures that HTML table elements cannot be selected and they will provide structure for data and aid screen readers to discover relationship between data in terms of rows and columns. At block 315, the position value of data elements (DIVs) is changed to absolute. Thus, their position will be orientated with respect to the parent container. At block 320, the DIVs top-left property is set, which will position them according to the top-left corner of the table. The initial data available is exactly the coordinates specific to the top-left corner of the table. This situation is presented in FIG. 6. The data is positioned according to their offset, but table borders are not adequate.

Figures 7, 8:
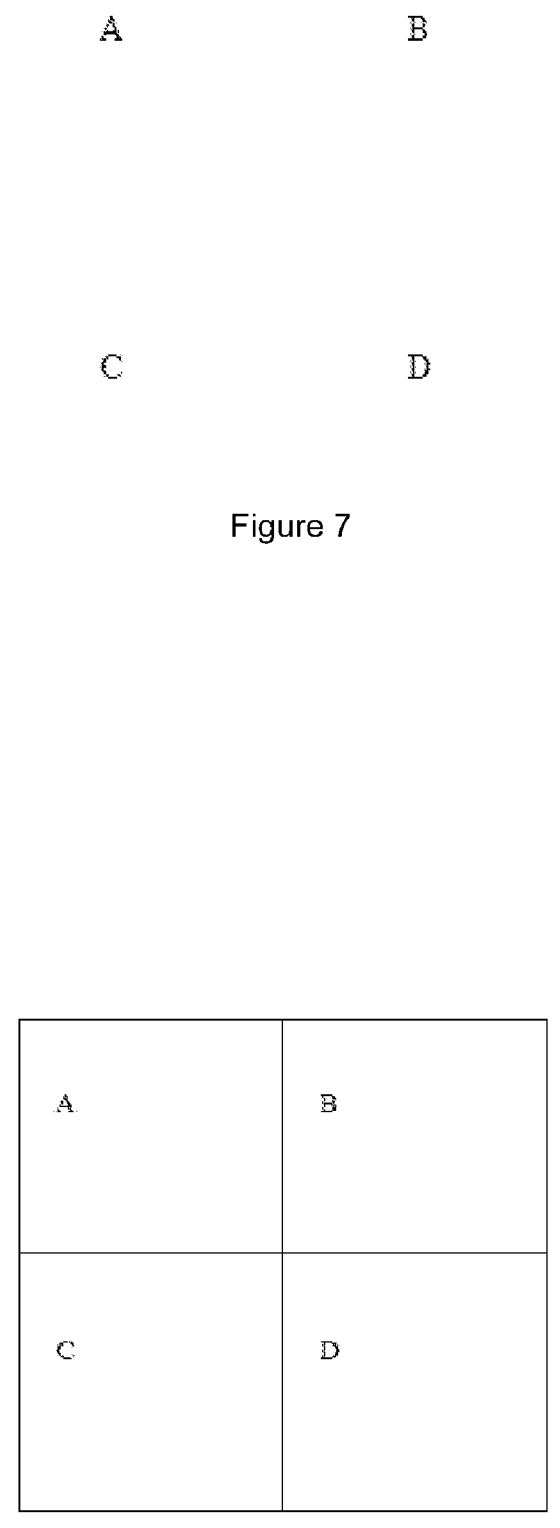

Referring again to FIG. 3, at block 325, the width and height property of the table is set to 1 pixel, thus hiding the structure of the table and making the table non-selectable; in addition, the border properties of the table are removed, as shown in FIG. 7. The table will become invisible and will only provide structure for a screen-reader to pick up table row and column information. Optionally, at block 330, the table border is added as DIV's on top of table data, which is illustrated in FIG. 8.

Figure 4:
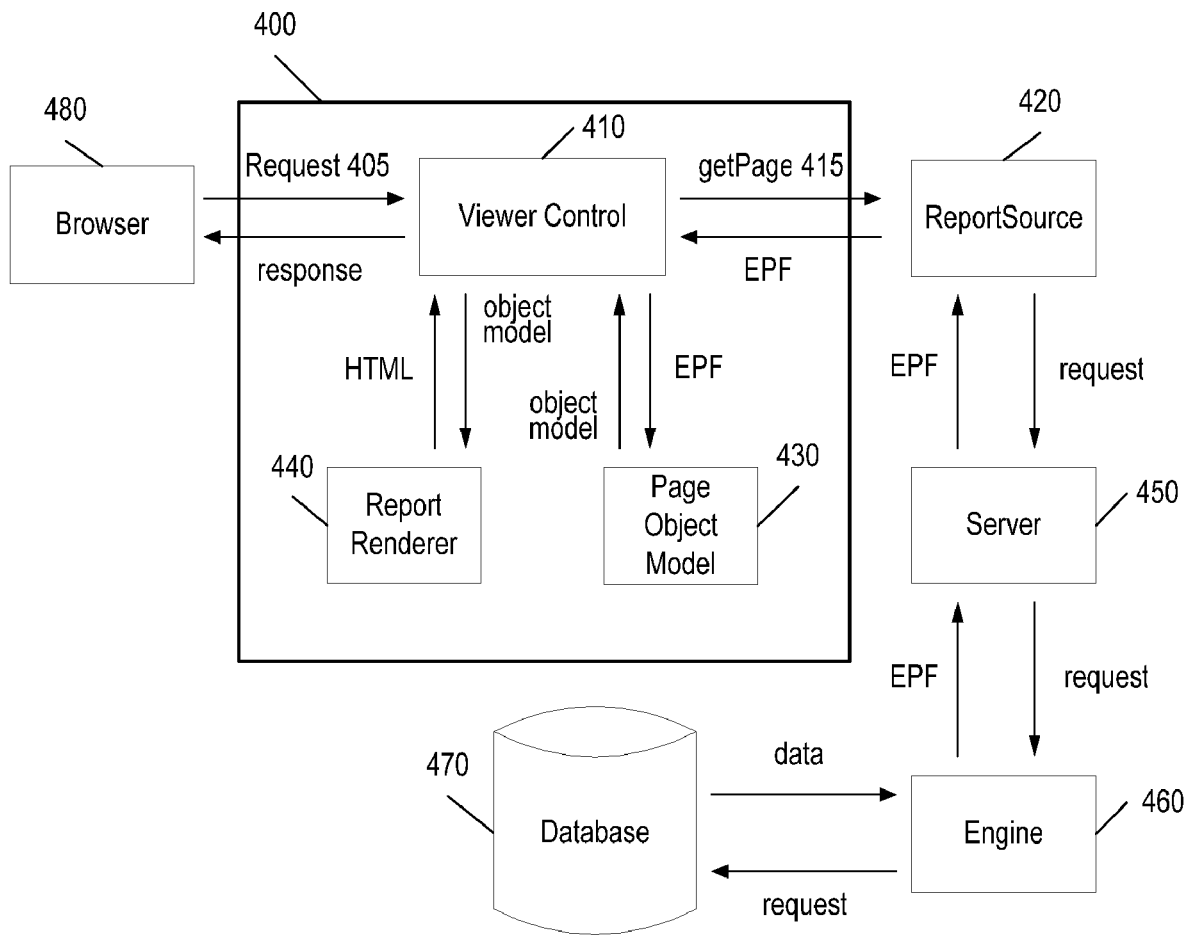
FIG. 4 is a block diagram of an embodiment of a system to render HTML tables and crosstabs when converting data from report files.

FIG. 4 is a block diagram of an embodiment of a system to render HTML tables and crosstabs when converting data from report files where all data coordinates of a table and its elements are specific to the top-left corner of the table. Referring to FIG. 4, a Report Viewer 400 includes a Viewer Control 410, a Page Object Model 430, and a Report Renderer 440. The Viewer Control 410 receives requests 405 for a report to be viewed by browser 480 and transfers this request to ReportSource 420. In one embodiment, the request is the getPage method to the ReportSource 420. In this embodiment, the getPage 415 request is the page number of the report page being requested. The request may be transferred via a Server 450 and an Engine 460 to a Database 470. Better performance could be acquired by taking advantage of the caching of the Server 450, when the same data being requested again. This will speed up the process of delivering already requested data. The Engine 460 derives data from the Database 470 and returns Encapsulated Page Format (EPF) to the server. EPF is a byte stream that is transferred back through the Server 450 and the ReportSource 420 to the Viewer Control 410. EPF describes everything needed for a report page. The EPF is converted to an object model by the Page Object Model 430. Page Object Model 430 receives EPF from the Viewer Control 410 and returns the object model to the Viewer Control 410. The object model is used for binding along the conversion of the report from EPF byte stream to HTML. Further, the Viewer Control 410 uses the Report Renderer 440 to transform the object model to its HTML representation to be used by the browser 480. The HTML provided by the Report Renderer 440 is sent by the Viewer Control 410 to the browser 480.

At the time of the conversion of the object model into HTML, if tables are present in the report, and when the only data for the orientation of the table elements in the tables is information, related to the top-left corner of the table, in such a case, the following technique is used. First, the position value of each table data (TD) is changed to "absolute". Thus, the position of each TD is positioned at the specified coordinates relative to its containing block, which is the table. Then, the top-left offset of TDs is set to 0 pixel, 0 pixel. After all the cells offset are set, all cells appear on top of each other and each TD's top left corner appears on top of the table's top left corner. Second, the width and height of each TD is set to 1 pixel, making the table elements non-selectable. The position and dimension of data elements placed in each TD remains unaffected. Next, the position value of data elements (DIV) is changed to absolute. Thus their position will be orientated with respect to the parent container. The next step is setting the DIVs top-left property, which will position the DIVs with respect to the top-left corner of the table. In one embodiment, the width and height property of table is set to 1 pixel, and the border properties of the table are removed. In this embodiment, the table will become invisible and will only provide structure for a screen-reader to retrieve table row and column information. In another embodiment, the table border is added as DIV's on top of the table data.

The following HTML code shows an exemplary implementation of the invention. In this case, the technique described above in relation to FIG. 3 and FIG. 4 for rendering crosstabs in HTML, is used.

```
<html>
<head>
<style type="text/css"> /* Define the Style of text in a table. */
    body {
        margin: 0px;
    }
```

```
table {           /* Style of Table */
    border-collapse: collapse;
        /* Hide the table by setting the width and height
        to 1 pixel. */
    width: 1px;
    height: 1px;
}
td {              /* Style of Cell */
    position:absolute;    /* Absolute positioning of cells. */
    width: 1px;
    height: 1px;
    vertical-align: top;
}
td div {          /* Style of Cell with DIV */
    position: relative;    /* Relative positioning of cells
    with DIVs. */
    left:20px;
    top: 40px;
}
/* The following are CSS classes that define elements of a table
border. .border .top .bottom .left .right .horizontal .vertical */
.border {
    margin: 0px;
    padding: 0px;
    position: absolute;
    white-space: none;
}
.top {
    border-top: 2px dotted black;
}
.bottom {
    border-bottom:2px dotted black;
}
.left {
    border-left: 2px dotted black;
}
.right {
    border-right: 2px dotted black;
}
.horizontal {
    width: 307px;
    height: 0px;
}
.vertical {
    height: 300px;
    width: 1px;
}
div#container {
    position: relative;
    top: 50px;
    left: 50px;
}
</style>
</head>
<body>
<!-- Here a table is drawn within a DIV called container. Each cell
is given a relative offset to move it away from the table origin. Each cells
origin is at table origin. Relative positioning of cells with DIVs. -->
    <div id="container">
    <table>
        <tr> <!-- Row 1 -->
            <td><div
style="height:150px;width:150px;top:40px;left:20px">A</div></td>
            <td><div
style="height:150px;width:150px;top:40px;left:170px">B</div></td>
        </tr>
        <tr> <!-- Row 2 -->
            <td><div
style="height:150px;width:150px;top:190px;left:20px">C</div></td>
            <td><div
style="height:150px;width:150px;top:190px;left:170px">D</div></td>
        </tr>
    </table>
    <div class="border bottom horizontal"></div>
    <div class="border right vertical"></div>
    <div class="border bottom horizontal" style="top:300px"></div>
    <div class="border bottom horizontal" style="top:150px"></div>
    <div class="border right vertical" style="left:306px"></div>
    <div class="border right vertical" style="left:153px"></div>
    </container>
</body>
</html>
```

The invention can be implemented as a computer program product, i.e. a computer program tangibly embodied in a computer-readable medium, for execution by, or to control the operation of, data processing apparatus, e.g. a programmable processor, a computer or multiple computers. A computer program can be written in any form or programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output.

Processors suitable for execution of a computer program include by way of example, both general and special purpose microprocessors, and any one or more processors of any kind of digital computer. Generally a processor will receive instructions and data from a read-only memory or a random access memory or both. The essential elements of a computer are a processor for executing instructions and one or more devices for storing instructions and data. Generally, a computer will also include, or be operatively coupled to receive data from or transfer data to, or both, one or more mass storage devices for storing data, e.g., magnetic, magneto-optical disks, or optical disks. Examples of computer-readable media include, but are not limited to all forms of non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

To provide for interaction with a user, the invention can be implemented on a computer having a display device such as a CRT (cathode ray tube) or LCD (liquid crystal display) monitor for displaying to the user and a keyboard and a pointing device such as a mouse or trackball by which the user can provide input to the computer.

The invention has been described in terms of particular embodiments. Other embodiments are within the scope of the following claims. For example, the steps of the invention can be performed in a different order and still achieve desirable results.

The above description of illustrated embodiments of the invention, including what is described in the Abstract, is not limited to be exhaustive or to limit the invention to the precise forms disclosed. While specific embodiments of and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather the scope of the invention is to be determined entirely by the following claims.

What is claimed is:

1. A computerized method for rendering HTML tables and crosstabs where data coordinates are specific to a top-left corner of a table, comprising:
   changing position value of a set of table data to absolute;
   setting top-left offset of the set of table data to 0 pixel, 0 pixel;
   changing width and height of the set of table data to 1 pixel;
   changing position value of data elements to absolute, wherein the position is with respect to a parent container;
   setting data elements top-left property according to available data for positioning within the parent container;
   setting width and height property of the table to 1 pixel; and
   removing border's property of the table.

2. The method of claim 1 further comprising adding a table border as data elements' border on top of the set of table data.

3. A computer system to render HTML tables and crosstabs, where data coordinates are specific to a top-left corner of a table, comprising:
   one or more processors;
   one or more non-transitory memory devices, the memory devices having stored thereon instructions related to:
   a viewer control to receive a request from a browser for viewing;
   a report source to provide Encapsulated Page Format byte stream to the viewer control;
   a page object model to convert the Encapsulated Page Format byte stream to an object model;
   a report renderer to convert the object model to HTML, wherein the report renderer is operable to change the position value of a set of table data to absolute, set top-left offset of the set of table data to 0 pixel, 0 pixel, change width and height of the set of table data to 1 pixel, change position value of data elements to absolute, wherein the position is with respect to a parent container, set data elements top-left property according to available data for positioning within the parent container, set width and height property of the table to 1 pixel and remove border's property of the table.

4. The system of claim 3, wherein the report source retrieves the Encapsulated Page Format byte stream from a database.

5. The system of claim 4 further comprising a server for the communication between the report source and the database.

6. The system of claim 5 further comprising a database engine to retrieve the data from the database and send the Encapsulated Page Format byte stream to the server.

7. The system of claim 3, wherein the report renderer is further operable to add a table border as data elements' border on top of the set of table data.

8. A computer program product, tangibly stored on a machine readable medium for rendering HTML tables and crosstabs, wherein data coordinates are specific to a top-left corner of a table, the product comprising instructions operable to cause a processor to:
   change position value of a set of table data to absolute;
   set top-left offset of the set of table data to 0 pixel, 0 pixel;
   change width and height of the set of table data to 1 pixel;
   change position value of data elements to absolute, wherein the position is with respect to a parent container;
   set data elements top-left property according to available data for positioning within the parent container;
   set width and height property of the table to 1 pixel; and
   remove border's property of the table.

9. The product of claim 8, further comprising instructions to add a table border as data elements' border on top of the set of table data.

* * * * *